United States Patent

[11] 3,574,462

[72] Inventor Gale A. Harvey
 Hampton, Va.
[21] Appl. No. 762,935
[22] Filed Sept. 26, 1968
[45] Patented Apr. 13, 1971
[73] Assignee The United States of America, as represented by the Administrator of the National Aeronautics and Space Administration.

[54] MAKSUTOV SPECTROGRAPH
 2 Claims, 3 Drawing Figs.
[52] U.S. Cl. .................................................. 356/76
[51] Int. Cl. .................................................. G01j 3/40
[50] Field of Search .......................................... 356/74, 76; 350/162, 199, 200

[56] References Cited
OTHER REFERENCES

"New Catadioptric Meniscus System" D.D. Maksutov; J. Optical Society of America Vol. 34 05, May 1944 pg. 278 & 281 in class 350–200

A Cinespectrograph for Reentry Measurements; Plakun & Schupp; Journal of the SMPTE; Vol. 74 01; Jan. 1965; pg. 25–27; in class 350–199

A Telescope Suitable for Rocket-Borne Instrumentation; Verdone; applied Optics; Vol. 6 03; Mar. 1967; pg. 570 & 571.

Primary Examiner—Ronald L. Wibert
Assistant Examiner—V. P. McGraw
Attorneys—Howard J. Osborn, John R. Benefiel and G. T. Mc Coy ABSTRACT: A spectrograph especially suited for research analysis of low level sources in such areas as reentry spectroscopy, comprising a high efficiency transmission grating or prism combined with a simplified Maksutov optical layout, and featuring lightweight structural components and arrangements which minimize thermally induced misalignments and simple adjustment mechanisms for focus of the film surface and alignment of the optical elements.

PATENTED APR 13 1971 3,574,462

INVENTOR.
GALE A. HARVEY

BY

ATTORNEYS

INVENTOR.
GALE A. HARVEY
BY
John R. Benefield
ATTORNEYS

MAKSUTOV SPECTROGRAPH

The invention described herein was made by an employee of the United States Government and may be manufactured and used by or for the Government for governmental purposes without the payment of any royalties thereon or therefor.

This invention relates to spectrography and particularly to a spectrograph suited for low-light-level research. Research in these areas presents special problems, foremost among which is one of a need for a great deal of sensitivity as a result of the extremely low levels of radiant energy encountered, and in addition, a reasonably broad spectral range and field-of-view are highly desirable. Furthermore, since field use is common, ease of handing in the field and freedom from a sensitivity to thermal changes are also prime characteristics in such a spectrograph. This field use also makes a capability for simple alignment and adjustment of components important. Finally, simplicity and low cost are of course universally desirable qualities in any such devices.

Prior art efforts to supply suitable spectrographs have concentrated on slitless devices, since rather loose resolution requirements allowed their use and a major improvement in sensitivity was thereby had. These devices, however, were deficient in one or more of those areas pointed out above to be of substantial importance.

Therefore, it is an object of the present invention to provide a spectrograph having a high degree of sensitivity.

It is a further object to provide a spectrograph having both a wide field-of-view and a broad spectral range.

It is another object to provide such a device in which the effects of thermal variations on optical alignment are minimal.

Yet another object to provide such a device which is easily adjustable to provide both focus of the film in the image plane and alignment of the optical elements.

Still another object is to provide a lightweight instrument easily handled in field operations.

These and other objects which will become apparent upon a reading of the specification are accomplished by use of a Maksutov optical layout with a single corrector lens, and a high efficiency fused quartz transmission diffraction grating. Positioning of the elements is accomplished by invar rods independently of the housing, and by a micrometer screw film pedestal. A bakelite housing and foamed plastic retaining rings for the corrector lens and grating provide both lightness and thermal insulation.

In the drawings, FIG. 1 is a perspective view of a spectrograph according to the present invention.

Figure 1:
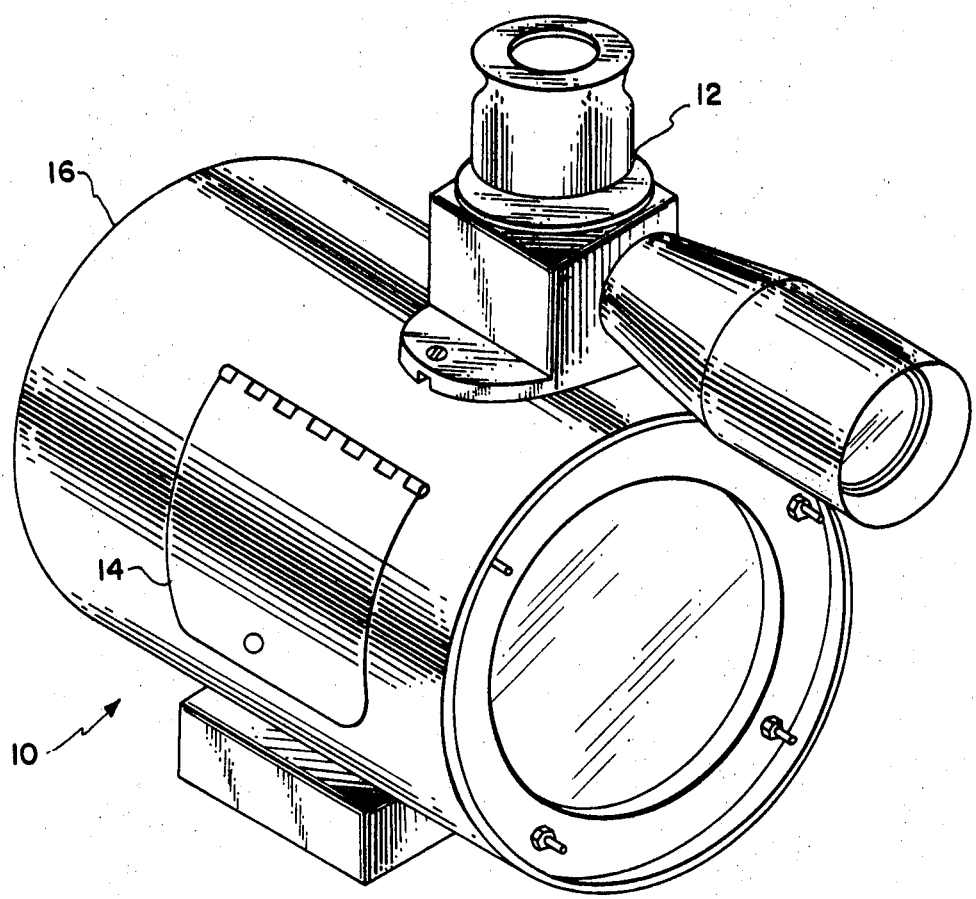

Referring now to the drawings and in particular to FIG. 1, 10 indicates generally a spectrograph according to the present invention. Detachably mounted thereon is a telescope assembly 12, used to sight the source to be investigated.

An access door 14 is provided in the spectrograph housing 16 for film handling purposes.

Figure 3:
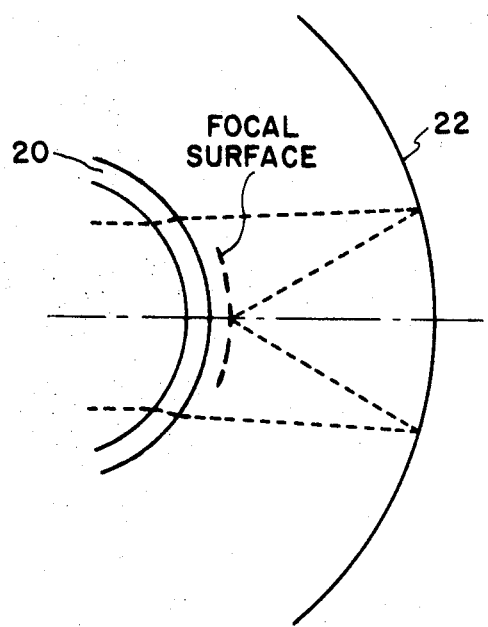
FIG. 3 is a diagram of the optical system.
Figure 2:
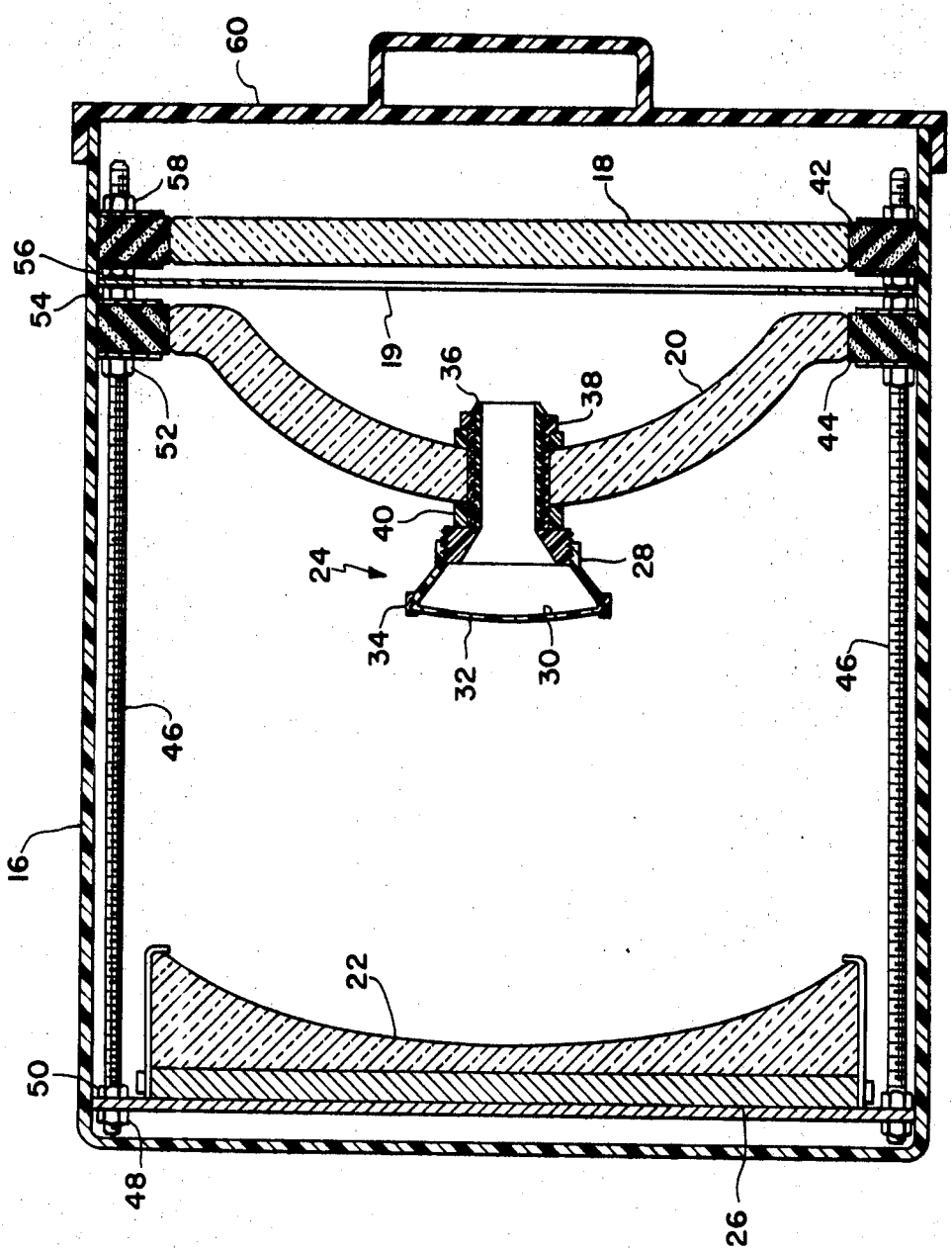
FIG. 2 is a view of a section taken along the longitudinal axis of the device.

As seen in FIG. 2, the primary components of the spectrograph 10, are a dispersing element, shown as a transmission diffraction grating 18, an optical stop 19, a meniscus correcting lens 20, a spherical mirror 22, and film positioning pedestal assembly 24. A layout of the optical system is shown in FIG. 3.

The diffraction grating 18 is a high efficiency component composed of optical-grade fused silica having 75 lines/m.m., and may be blazed for various wavelengths in order to obtain higher efficiency in specific ranges of interest, such as blazing for 3400 or 3800A for the near ultraviolet and blue, or 5461A for the visible and near infrared. As an alternative, an objective prism may be used as the dispersing element, formed also of fused silica material. These elements impart a broad spectral range to the instrument.

The Maksutov corrector lens 20 is also fabricated from optical-grade fused silica, and has radii of curvature and thickness to minimize chromatic and spherical aberration at the center of the field, in a manner as is known in the prior art.

The spherical mirror 22 is formed from standard telescope pyrex mirror blanks, and is retained in a standard case aluminum mirror mount 26.

The film pedestal assembly 24 is comprised of a pedestal member 28 having a wall 30 corresponding to the focal surface, and the film 32 is positioned against the outer surface thereof by a locking ring 34, which either threadedly engages the member 28 as shown or has a bayonet connection therewith. Pedestal member 28 threadedly engages a bolt member 36 which is fastened to the corrector lens 20 by means of a nut 38 and a washer 40. This threaded connection allows precision micrometer focusing of the film surface into the focal surface, and for such purpose, index markings may be scribed onto members 28 and 36. Note that all of the primary components of both the optical and spectrographic systems are aligned along a common axis shown in FIG. 3 by the centerline passing through the focal point of the lens 20 and mirror 22.

These primary components are supported and positioned with respect to each other by means of low thermal coefficient of expansion structural components. These include foamed plastic rings 42 and 44, which may be of polystyrene, supporting the correcting lens 20 and the diffraction grating 18, respectively, which combine low coefficient of thermal expansion with lightweight and high insulating properties to yield a very advantageous mounting structure.

These elements are positioned with respect to each other and the mirror 22 by means of four nickel-steel or invar rods 46, which have low coefficients of thermal expansion. These rods 46 pass through all of these elements' supporting structure and are positioned with respect to each other by means of pairs of nuts 48 and 50, 52 and 54, and 56 and 58 engaging respective threaded portions of the rod on opposite points of each element's supporting structure. Thus, adjustability of position with respect to both concentricity and focus is provided by a very simple arrangement, without introducing significant thermally induced variations in such parameters.

This assembly is retained in the lightweight bakelike housing 16, without any fixed connection therebetween, hence eliminating any distorting forces which might otherwise be applied by the housing 16. This housing could also be of aluminum or magnesium. A lens cover 60 is provided which may be utilized as a shutter mechanism.

From the foregoing description, it can be appreciated that this arrangement yields important advantages for use in the field of low-light-level spectroscopic research.

The extreme simplicity of the optical system, having only three optical surfaces and one transmittive lens leads to both high sensitivity and efficiency, and low fabrication costs while still providing adequate correction for the system. The use of fused silica in the corrector lens and diffraction grating also contributes to improved sensitivity due to the high efficiency of transmitting received radiation, without sacrificing spectral range.

The independent, thermally isolated support structure minimizes thermal distortions encountered in field use.

The simple adjustability of the relative position of the various elements allows accurate alignment and focus of the system without introducing either greatly increased cost or weight penalties.

The support structure and housing have been arranged to both isolate thermal variations and render the device light enough for easy handling in the field.

I claim:
1. A Maksutov spectrograph comprising:
   a housing;
   a spherical mirror in said housing;
   a Maksutov lens;
   a transmission dispersion element;
   support members for said spherical mirror, said Maksutov lens and said transmission dispersion element;
   at least three rods adjustably positioning and aligning said mirror, lens and transmission dispersion element including pairs of threaded members threadedly engaging each rod at points stradling each of said support members;

a pedestal member located on the unreflected axis of the Maksutov optical system, said pedestal member being adjustably fastened to said lens and having a curved surface corresponding to the focal surface whereby single-frame film is molded to said curved surface of said pedestal member.

2. The spectrograph of claim 1 wherein said rods are composed of nickel-steel, said support members are composed of foamed plastic, said dispersion element is a diffraction grating composed of fused silica, said pedestal member includes a threaded pedestal support member between said lens and said pedestal member, and wherein said housing is composed of bakelite.